US010513194B2

(12) United States Patent
Eifert et al.

(10) Patent No.: US 10,513,194 B2
(45) Date of Patent: Dec. 24, 2019

(54) METHOD FOR CHARGING THE STARTER BATTERY OF A VEHICLE

(71) Applicant: FORD GLOBAL TECHNOLOGIES, LLC, Dearborn, MI (US)

(72) Inventors: Mark Eifert, Hessen (DE); Eckhard Karden, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/105,191

(22) Filed: Aug. 20, 2018

(65) Prior Publication Data
US 2018/0354385 A1 Dec. 13, 2018

Related U.S. Application Data

(62) Division of application No. 14/826,307, filed on Aug. 14, 2015, now Pat. No. 10,052,965.

(30) Foreign Application Priority Data

Sep. 30, 2014 (DE) ........................ 10 2014 219 823

(51) Int. Cl.
H02J 7/04 (2006.01)
H02J 7/16 (2006.01)
B60L 11/18 (2006.01)

(52) U.S. Cl.
CPC ....... B60L 11/1861 (2013.01); B60L 2240/80 (2013.01); Y02T 10/7005 (2013.01);
(Continued)

(58) Field of Classification Search
USPC .......................... 320/132, 134, 162, 109, 148
See application file for complete search history.

(56) References Cited

U.S. PATENT DOCUMENTS 4,937,528 A 6/1990 Palanisamy
5,488,283 A * 1/1996 Dougherty ........ H01M 10/0413
307/10.1
(Continued)

FOREIGN PATENT DOCUMENTS

CN 101373904 A 2/2009
CN 101740830 A 6/2010

OTHER PUBLICATIONS

German Examination Report for German Patent Application No. 102014219823.2 dated Jun. 24, 2015.
(Continued)

Primary Examiner — Brian Ngo
(74) Attorney, Agent, or Firm — Brooks Kushman PC; David Kelley

(57) ABSTRACT

A method for charging the starter battery of a motor vehicle at a voltage source includes charging the starter battery after a traction battery of the vehicle has been charged up to a defined value. The starter battery is charged if a charge state of the starter battery is established that is below a defined threshold value. If the charge state of the starter battery is of such a low level, the starter battery is charged until one or more defined termination conditions are fulfilled. The termination conditions may include the total charging period since the low charge state of the starter battery has been established exceeds a defined threshold value and/or the total time period charging the traction battery and the starter battery at the voltage source exceeds a defined threshold.

6 Claims, 3 Drawing Sheets

(52) U.S. Cl.
CPC ........ *Y02T 10/7044* (2013.01); *Y02T 10/7066* (2013.01); *Y02T 10/7077* (2013.01)

(56) References Cited

U.S. PATENT DOCUMENTS

| | | | | |
|---|---|---|---|---|
| 5,598,088 | A * | 1/1997 | Richter | G01R 31/3842 320/134 |
| 5,871,858 | A * | 2/1999 | Thomsen | B60R 25/04 429/7 |
| 6,281,600 | B1 * | 8/2001 | Hough | F02N 11/14 307/10.6 |
| 6,304,056 | B1 * | 10/2001 | Gale | H02J 7/0029 320/104 |
| 6,420,793 | B1 * | 7/2002 | Gale | F02N 11/04 123/179.28 |
| 8,736,101 | B2 | 5/2014 | Masuda et al. | |
| 2010/0019729 | A1 * | 1/2010 | Kaita | B60L 58/25 320/134 |
| 2010/0134065 | A1 * | 6/2010 | Iida | B60L 3/04 320/103 |
| 2010/0320959 | A1 * | 12/2010 | Tomberlin | B62D 31/003 320/101 |
| 2011/0068749 | A1 * | 3/2011 | Maleus | H02J 7/0068 320/162 |
| 2011/0082611 | A1 * | 4/2011 | Shiba | B60K 6/445 701/22 |
| 2011/0101915 | A1 * | 5/2011 | Mitsutani | B60K 6/445 320/109 |
| 2012/0081127 | A1 * | 4/2012 | Fricke | B60W 20/00 324/433 |
| 2012/0299377 | A1 * | 11/2012 | Masuda | B60L 50/51 307/10.1 |
| 2015/0336468 | A1 * | 11/2015 | Sugiyama | B60L 11/1864 701/22 |

OTHER PUBLICATIONS

Chinese Office Action for Chinese Application No. 201510609158.3 dated Aug. 5, 2019.

* cited by examiner

METHOD FOR CHARGING THE STARTER BATTERY OF A VEHICLE

CROSS-REFERENCE TO RELATED APPLICATIONS

This application is a division of U.S. application Ser. No. 14/826,307 filed Aug. 14, 2015 now U.S. Pat. No. 10,052,965 issued Aug. 21, 2018. This application claims foreign priority benefits under 35 U.S.C. § 119(a)-(d) to DE 10 2014 219 823.2 filed Sep. 30, 2014, which is hereby incorporated by reference in its entirety.

TECHNICAL FIELD

The invention relates to a method for charging the starter battery of a motor vehicle at a voltage source, wherein the starter battery is charged after the traction battery of the vehicle has already been charged to a defined maximum value.

BACKGROUND

The starter battery of a motor vehicle is an accumulator that provides at least the electrical current for the starter of a combustion engine. The battery of an electric vehicle that is used to drive the vehicle is, in contrast, referred to as the traction battery. Furthermore, electric vehicles or hybrid vehicles can also comprise a starter battery. Lead accumulators by way of example can be used as batteries and said lead accumulators are also described herein as lead acid batteries.

Starter batteries are typically charged during the journey by a generator, such as an alternator. The operating state of the vehicle can be used as an aid for the charging strategy to increase the serviceable life of the starter battery. As an example, U.S. Pat. No. 4,937,528 provides. in one embodiment that a generator is switched on and off depending upon the charge state of the battery and the operating state of the vehicle. The generator can be switched off if the charge state of the battery has achieved a defined value and has not yet dropped back to below a lower threshold value. However, if the vehicle is in a situation in which the current requirement is increased, it is possible to provide that the generator remains switched on even if the charge state of the battery has already returned to a defined threshold value. These situations can occur by way of example at night, in winter, or if the air-conditioning is running.

A plug-in hybrid vehicle or electric vehicle is normally charged at the power grid until the traction battery has been fully charged. The charging system of the vehicle is subsequently automatically deactivated. However, in the event that a low charge state of the starter battery is detected, the strategy can be extended to also charge the starter battery at the power grid. The charging system of the vehicle is then not switched off after the traction battery has been fully charged, but rather continues with equalizing the charge of the starter battery.

Fundamentally, the starter battery must be sufficiently charged so that the vehicle can be started at the next opportunity and the low voltage current supply of the vehicle (12V) can be supplied with a minimum voltage level during the transient periods of high current. However, it can take a whole day to fully recharge a battery and a long charging period of this type can cause customer dissatisfaction. The reason for this is, on the one hand, the current costs, but also the unusual behavior of the vehicle owing to the fact that it is not switched off within a usual time period. In addition, an old and damaged battery can develop a considerable amount of gas and become hot if it is charged at the power grid over a long period of time. The charging process at the power grid is usually performed without supervision and in an enclosed garage. This may lead to problems and thus also to customer dissatisfaction. Problems when charging lead acid batteries at the power grid are further aggravated by the fact that it is to be expected that batteries deteriorate as they get older.

SUMMARY

A method for charging the starter battery of a motor vehicle solves the problems described above in that the electrical functionality of the battery is to be ensured while at the same time keeping the time period for charging the battery as short as possible. A method in accordance with one embodiment includes controlling a vehicle having a starter battery, a traction battery, and an engine in communication with at least one controller while the vehicle is connected to a stationary power source. The at least one controller performs the method comprising charging the traction battery, charging the starter battery to a second charge state after the traction battery charges to a first charge state, deactivating current from the power source after the traction and starter batteries charge to the first and second charge states, respectively, after expiration of a predetermined time period, periodically reactivating current from the power source to monitor the starter battery charge state; and resuming charging of the starter battery if the starter battery charge state is below a first threshold.

In another embodiment, a method for charging a starter battery of a vehicle having an engine and a traction battery at a voltage source includes charging, by a controller, the starter battery after the traction battery charges to a first value if the starter battery charge is below a second value until at least one of (1) a starter battery charging period exceeds a first threshold and (2) a traction battery charging period exceeds a second threshold.

In one embodiment, a method for a vehicle having a traction battery, a starter battery, and a control module while the vehicle is connected to a power grid, includes, by the control module, activating current supply to the starter battery in response to the traction battery exceeding a first threshold and the starter battery being below a second threshold, and deactivating current supply from the power grid a predetermined time after the starter battery exceeds a third threshold.

It is to be noted that the features that are mentioned individually in the claims can be combined one with the other in any technically expedient manner and demonstrate further embodiments of the claimed subject matter that may not be explicitly described or illustrated. In addition, the description characterizes and specifies the embodiments in particular in conjunction with the figures.

In the case of the method in accordance with the embodiments for charging the starter battery of a motor vehicle at a voltage source, the starter battery is charged after the traction battery of the vehicle has been charged up to a defined value. This value can define a state where the traction battery is fully charged but also can define charge states that are below a fully charged state. The voltage source concerned is a local power supply network to which the vehicle is connected.

In accordance with one or more embodiments, the starter battery is charged if a charge state of the starter battery is established that is below a defined threshold value. If the charge state of the starter battery is consequently not sufficient to ensure the electrical functionality of the vehicle, the starter battery is charged. The starter battery is charged until one or more defined termination conditions are fulfilled, said defined termination conditions may include at least that: the total charging period since the low charge state of the starter battery has been established exceeds a defined threshold value, and/or the total time period charging the traction battery and the starter battery at the voltage source exceeds a defined threshold value. The duration of the process of charging the starter battery is thus limited to improve customer satisfaction. However, it is also thus possible to avoid long phases of non-supervised battery charging. However, the time limits are to be selected in an expedient manner so that the electrical functionality is guaranteed at least for the next journey. Consequently, it is not necessary for the time period to be sufficient in order to fully charge the starter battery. In one embodiment, the termination conditions therefore define a charge state of the starter battery that is below the fully charged state. A prerequisite is that the charge state of the battery can be further improved during the next journey and subsequent charging phases at the power grid. The method in accordance with one or more embodiments consequently synchronizes the requirements for robustness with customer satisfaction.

The charge state of the starter battery may be continuously ascertained. One of the termination conditions may be that the measured charge state of the starter battery exceeds a defined threshold value. Even in this case, it is not necessary that this threshold value defines the fully charged state of the starter battery, but rather merely a charge state that ensures the electrical functionality at least for the next journey.

The termination conditions can be further defined or determined by charging the starter battery until: the charge supplied to the battery after the low charge state of the starter battery has been established exceeds a defined threshold value and/or the charge supplied to the battery after the vehicle has been connected to the voltage source exceeds a defined threshold value. The starter battery may be charged with a desired voltage value that produces a charge equalization of the starter battery.

It is furthermore possible that the traction battery has been fully recharged at the power grid but that the starter battery loses charge as a result of loads while the vehicle remains parked. The reason for this is that vehicle procedures when controlling plug-in vehicles include conventional measures for deactivating the vehicle if said vehicle is connected to the power grid and the traction battery is already fully charged. The electrical current consumption is thus limited. However, if the vehicle is connected to the power grid for long periods of time, the starter battery can be discharged up to the point at which it can no longer initiate the start-up of the vehicle. In order to solve this problem, in one embodiment a strategy is provided for periodically activating the current supply of the vehicle to monitor the starter battery while the vehicle is connected to the power grid for longer periods of time. If it is established during this periodic monitoring that the charge stage of the starter battery is too low, the elimination strategy as described above is activated.

It is therefore provided in one embodiment of the method that the current supply of the vehicle is deactivated after the expiry of a defined time interval that the vehicle is connected to the voltage source, and the current supply is periodically re-activated and the charge state of the starter battery is ascertained.

The battery charge state can be monitored using a conventional voltage sensor or various other strategies. This can be achieved by way of example by determining the no-load voltage during long phases connected to the power grid or phases during which the vehicle is deactivated.

The method in accordance with various embodiments can be used in particular for controlling the voltage in a low voltage current distribution network (11-16V) of a plug-in electric vehicle or a hybrid plug-in electric vehicle. However, it can also be used in low voltage current distribution networks in aircraft and watercraft insofar as they comprise a similar electrical architecture using battery storage systems that are charged if they are by way of example in the hangar or are moored at a dock.

Further advantages, special features and expedient further developments of various embodiments are described and illustrated with reference to the drawings.

DETAILED DESCRIPTION

Figure 1:
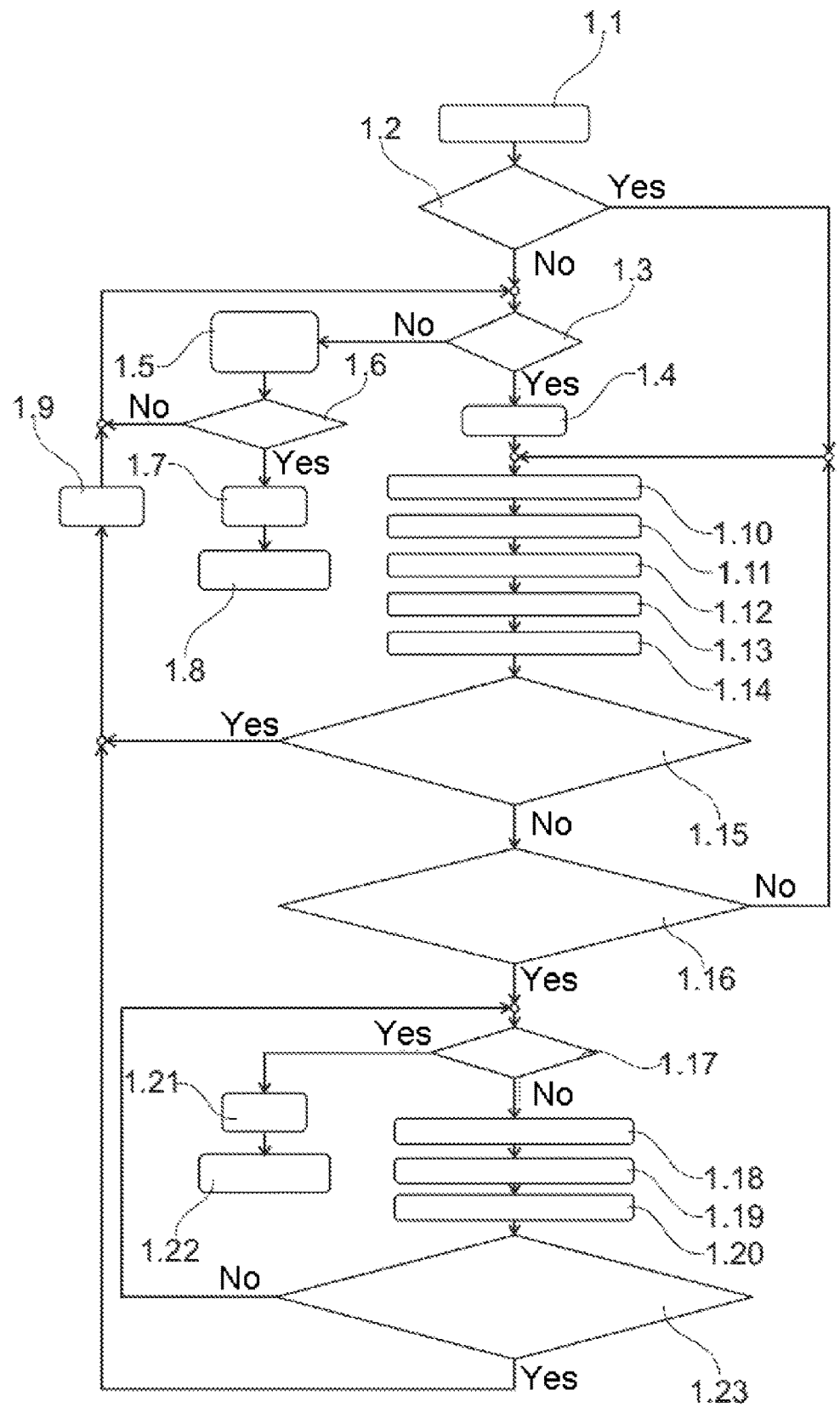
FIG. 1 illustrates one embodiment of a control strategy in the case of a low charge state of the starter battery during the charging period at the power grid.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

The claimed subject matter includes monitoring and charging strategies for engine starter batters such as lead acid batteries. These batteries can also be referred to as SLI batteries since they provide current for starting, lighting, and ignition (Starting-Lighting-Ignition). As an example, monitoring and charging strategies for this purpose are described that can be active in three operating modes if the vehicle is connected to a voltage source, such as a power supply system. This includes the processes of charging the traction battery at the power grid, the periodic monitoring of the charge state of the starter battery during long-term periods where the vehicle is parked connected to the power grid, and the elimination of long-lasting states with a low battery charge state (SOC-State of Charge).

By way of example, it is possible to eliminate a low charge state of the starter battery during the mode where the traction battery is being charged at the power grid. The starter battery is subsequently charged after the traction battery has been charged. If the charge state of the starter battery is identified as being sufficient, the mode automatically terminates if the traction battery is fully charged. Otherwise, the mode can be extended to charge the starter battery.

A possible long-term parking phase at the power grid occurs after the process of charging the traction battery and the starter battery has been automatically terminated but the vehicle is still connected to the power grid. A control strategy is provided for planning the duration of the processes of periodic monitoring and elimination of a low charge state of the starter battery during a long-term parking phase at the power grid. Furthermore, a monitoring algorithm is described that identifies a low charge state under these conditions.

An elimination phase can commence if a low charge state of the starter battery is detected during a long-term parking phase at the power grid, or if a low charge state of a previous operating mode is still prevailing and is still active if a monitoring and elimination event occurs. The monitoring and elimination strategies for a low charge state can be performed in conjunction with existing current supply control strategies.

Whilst the vehicle is travelling or is connected to the power grid, the starter battery can be monitored using a conventional potential or voltage sensor or by various other strategies. If a lower charge state of a starter battery is detected, a sufficiently high voltage that charges each cell to its maximum potential is provided to charge the battery. A charging strategy of this type is also referred to as an equalization charging process. During an equalization charging process, a desired voltage value is used that facilitates the charging of all cells in a lead accumulator to a fully charged state. The desired voltage value is normally temperature-dependent and frequently defined in such a manner that the rate in which gas is developed is below a maximum value in the middle of the defined temperature range. The z-curve that defines the equalization charging process can be obtained from the battery manufacturer or can be defined by the vehicle manufacturer to function well in a given target vehicle that has a predetermined profile of utilization. The z-curve defines the voltage at the connection terminals of the battery.

In contrast, the trickle charging process is a control strategy for the desired voltage value of a motor vehicle current supply that minimizes the battery current and maintains the battery charge state at or around a fixed value. A trickle charging process can be performed in one of two ways: as a temperature-dependent voltage that is defined at the battery connection terminals or as a current control strategy that controls the desired voltage value of the current supply (DCDC-converter or generator) in such a manner that the battery current remains at zero. The latter method can be referred to as zero current control since it controls the desired voltage value in such a manner that the battery current is equal to zero.

Battery charging strategies can supply the starter battery with a desired voltage value for the equalization charging process while the vehicle is travelling or while the traction battery is connected to the power grid without having to choose between these two states. However, strategies can also be used that in dependence upon the battery mode of the vehicle (connected to the power grid, travelling disconnected from the power grid, etc.) or in dependence upon a timer-based plan use desired equalization charging voltage values or lower desired trickle charging values.

Elimination strategies for low charge states of the battery can moreover be integrated into existing current supply management strategies. In so doing, a desired equalization charging value can be maintained by way of example in the case of an activated vehicle and during the charging process until the charge state that is too low is eliminated.

A low charge state can be deemed eliminated if one or more termination conditions are fulfilled. The termination conditions may include at least: 1) the total charging period since the low charge state of the starter battery has been established exceeds a defined threshold value, 2) the total time period charging the traction battery and the starter battery at the voltage source exceeds a defined limit value, and/or 3) the continuously measured charge state of the starter battery exceeds a defined threshold value.

It is to be observed that the elimination of a low charge state of the starter battery can take multiple driving phases and charging phases at the power grid. As such, the information regarding the charge state condition after a low charge state has been initially detected is also available in subsequent operating phases. In order to perform this, a corresponding indicator (flag) can be stored in a non-volatile memory. This flag is only deleted if termination conditions that define an elimination of the battery state that is too low are fulfilled.

If a low charge state is detected in the starter battery during the charging process at the power grid, or if earlier information regarding a low charge state is transmitted to the control strategy at the commencement of the charging process at the power grid, the battery may be charged with an equalization charging voltage. This continues until one or a combination of multiple termination conditions or exit conditions for the elimination strategy are fulfilled. In this case, the following conditions are added to the previously mentioned conditions: 4) the charge of the battery after establishing the low charge state of the starter battery exceeds a defined threshold value, and/or 5) the charge of the battery after connecting the vehicle to the voltage source exceeds a defined threshold.

The conditions 1, 3 and 4 represent conditions for completely eliminating a low charge state. As illustrated in FIG. 1, the fulfillment of one or more of these conditions causes the termination of the low charge state and the corresponding flag that is stored in the non-volatile memory to be reset.

The conditions 2 and 5 represent minimum conditions for the automatic termination of the battery charging process at which the electrical functionality of the vehicle is ensured. This includes the ability to re-start the vehicle and to support transient high current loads. The threshold values or rather thresholds that define these conditions are preferably calibrated in such a manner that the charge that is supplied to the battery during the charging phase at the power grid is sufficient to maintain a charge state that guarantees the electrical functionality in the case of given maximum loads during the parking phase at the power grid. If the conditions 2 and 5 or a combination thereof with the remaining conditions are used to define the exit conditions, the battery charging process at the power grid can be extended beyond the traction battery charging period. This occurs in dependence upon the calibration of the thresholds that are used to define the exit conditions. Once the exit conditions have been fulfilled and the traction battery fully charged, the charging process at the power grid can be automatically terminated. Furthermore, the vehicle can be automatically switched off. However, the corresponding flag for the low charge state is only reset if at this point in time the conditions 1, 3, and/or 4 are fulfilled.

The elimination strategy for a detected or assumed low charge state during the charging period of the traction battery at the power grid is illustrated in FIG. 1. As already described, any combination of the conditions can be selected for identifying fulfilled elimination or exit conditions. This implies that only one condition is required in each decision block and if more than one condition is available, this can be subjected to AND- or OR-operations.

In the case of the decision conditions in FIG. 1, the "global" equalization charging period refers to the entire time period during which equalization charging takes place after the low charge state has been recognized. This comprises time periods connected to the power grid and time periods during which the vehicle is travelling. In the event that a timer is used in order to alternate in planned intervals between an equalization charging process and a trickle charging process, said timer is reset if a low charge state is detected. The global equalization period is compared with the calibrated threshold EqChargePeriod to determine whether the low charge state has been eliminated. Similarly, the "global" integrated charge refers to the entire charge that flows into the battery after a low charge state is detected. Said "global" integrated charge is compared with the calibrated threshold GlobalChargeThresh to determine whether the low charge state can be eliminated.

On the other hand, equalization charging period "at the power grid" refers to the entire time period during the prevailing charging phase at the power grid in which the equalization charging process is used after the low charge state is detected. In the event of an assumed indication of a low charge state, this implies the entire time period since the commencement of the charging process at the power grid. This equalization charging period at the power grid is compared with the calibrated threshold OPEqChargePeriod to determine whether the elimination strategy can be terminated for the low charge state without terminating the SOC-condition. Moreover, the integrated charge "at the power grid" refers to the entire charge during the prevailing charging phase at the power grid, said entire charge flowing into the battery after a low charge state has been recognized. It is compared with the calibrated threshold OnPlugChargeThresh to determine whether the elimination strategy can be terminated.

The integrated current for the operation when connected to the power grid and also for when not connected to the power grid (global) is calculated as follows:

$$\text{Integrated Current} = \int_0^t IBatt \cdot dt \quad (1)$$

If a low charge state is not assumed and a low charge state of the starter battery is not detected at any point in time during the charging of the traction battery at the power grid, the nominal (normally existing) control strategy for charging the starter battery at the power grid is activated.

FIG. 1 illustrates in detail that after activating the process of charging the traction battery at the power grid, a check is performed at block 1.1 as to whether an already previously generated indicator (flag) indicating a low charge state of the battery must be assumed 1.2. If this is the case, the method moves to block 1.10. On the other hand, if this is not the case, the LowSOCFlag is only set at 1.4 if a low charge state has been detected at 1.4. The method also moves to block 1.10 in this case. However, as long as a low charge state of the battery is not detected, the normal current supply strategy is performed at 1.5. As soon as the traction battery is fully charged 1.6, the charging process at the power grid is terminated 1.7 and the vehicle is automatically shut down at block 1.8.

Block 1.10 of the flow chart in FIG. 1 provides that a desired voltage value is used for an equalization charging process. The "global" timer for the equalization charging process is activated in block 1.11 and the timer for the equalization charging process at the power grid is activated at block 1.12. Moreover, the "global" integrator for the battery current is activated in block 1.13 and the integrator for the battery charging process at the power grid is activated in block 1.14.

To determine whether the low charge state of the starter battery has been eliminated, the following conditions are checked at block 1.15:
"Global" time period of the equalization charging process is greater than the variable EqChargePeriod and/or
SOC is greater than LowSOCThresh and/or
Battery current $I_{Batt}$ integrated over the time period is greater than the variable GlobalChargeThresh.
If at least one of the above exit conditions is fulfilled, the flag LowSOCFlag is reset at block 1.9. If none of the exit conditions are fulfilled, a check is performed at 1.16 as to whether one of the following exit conditions is fulfilled:
Time period of the equalization charging process at the power grid is greater than the variable OPEqChargePeriod
and/or
Battery current $I_{Batt}$ integrated over the time period is greater than the variable OnPlugChargeThresh.
If one of these exit conditions is fulfilled, a check is performed at 1.17 as to whether the traction battery is fully charged. If the traction battery is fully charged, the charging process can be terminated at 1.21 and the vehicle automatically shut down at 1.22. However, as long as the traction battery is not fully charged, the desired voltage value is used in block 1.18 for an equalization charging process, the "global" timer for the equalization process is activated at 1.19 and the "global" integrator for the battery current is activated at 1.20.

The following conditions for eliminating the low charge state are rechecked in block 1.23:
"Global" time period of the equalization charging process is greater than the variable EqChargePeriod
and/or
SOC>LowSOCThresh
and/or
Battery current $I_{Batt}$ integrated over the time period is greater than the variable GlobalChargeThresh.
The flag LowSOCFlag is reset at block 1.9 only if one of these conditions is fulfilled.

The state of the battery can also be monitored during a long parking phase at the power grid. A long parking phase at the power grid commences if the traction battery has been fully charged and the current supply for the vehicle is automatically deactivated. A vehicle can remain parked for days or weeks at the power grid, wherein however the starter battery should be monitored periodically to determine whether the charge state has dropped below a minimum state in which the electrical functionality can no longer be guaranteed. In one embodiment, the invention provides a strategy for scheduling and performing periodic monitoring events of the starter battery. Furthermore, a special algorithm is provided for determining the charge state of the battery during these periodic monitoring events.

If a long-term parking phase at the power grid commences, in other words if the traction battery has been fully charged and the current supply of the vehicle has been automatically deactivated, a time stamp LongTermTimeStamp is set and stored in a non-volatile memory. The process of monitoring a low charge state and elimination strategies for this purpose are performed by a vehicle Electronic Control Module (ECM). The ECM can be periodically activated by other vehicle systems, or it can be programmed for this purpose to be able to perform the monitoring and elimination strategies. If the ECM is activated, it can compare the current time with the time stamp LongTermTimeStamp that has been set at the commencement of the long-term parking phase. If a calibrated time period LongTermTimeStamp has passed since storing this time period stamp, the charge state of the starter battery may be monitored. This can be performed using a conventional potential or voltage sensor for battery monitoring or using a specialized algorithm.

If a low charge state is detected, a variable LowSOCFlag is set to a value that indicates that a low charge state of the starter battery has not been eliminated. This variable is stored afresh in a non-volatile memory. Subsequently, the elimination strategy is activated during a long parking phase at the power grid. If however a sufficiently high charge state is detected after a longer monitoring period, a new time stamp LongTermTimeStamp can be stored in the non-volatile memory and the current supply of the vehicle can be deactivated.

Figure 2:
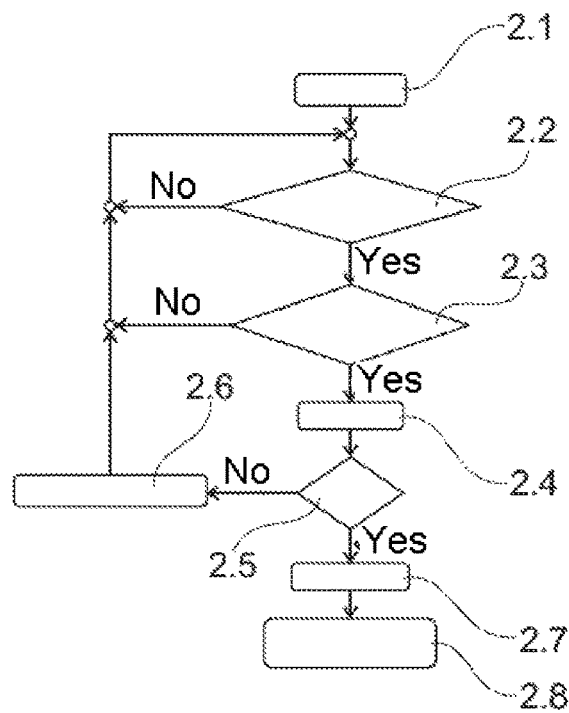
FIG. 2 illustrates an embodiment of a control strategy for monitoring the charge state of the starter battery during long-term phases connected to the power grid.

FIG. 2 represents the scheduled strategy for monitoring the charge state of the battery during long-term phases at the power grid and said scheduled strategy is integrated into the elimination strategy. The ECM is activated in block 2.1 and a check is performed in step 2.2 as to whether the vehicle is connected to the power grid and the traction battery is not being charged. Only if both conditions are fulfilled is a check performed in block 2.3 as to whether the difference between the prevailing time and the time stamp LongTermTimeStamp is greater than the calibrated time period LongTermMonPeriod. If this is the case, the process of monitoring the charge state of the battery is commenced as indicated at block 2.4. If a charge state that is too low is detected at block 2.5, the flag variable LowSOCFlag is set at block 2.7. Furthermore, a strategy for eliminating the low charge state is initiated as indicated at block 2.8. However, if a low charge state is not detected, the time stamp LongTermTimeStamp is set to the current time t at block 2.6.

As already mentioned, it is also possible to use a specialized monitoring algorithm for identifying low charge states during long-term parking phases. It is thus possible to avoid the costs of a battery monitoring sensor. An ECM is conventionally equipped with an A/D converter, wherein this can be used to estimate the battery voltage if the battery currents are low.

The no-load voltage of a starter battery can be used for precisely estimating the charge state if the battery has rested without significant charging or discharging currents over a long period of time and if the battery current is small during the measuring period (in the magnitude of 100 mA or less). These conditions can be fulfilled if the loads of the vehicle are within acceptable values, which is usually the case. Furthermore, the activation of the DC/DC convertor should be delayed or should not take place during the long-term period SOC monitoring events at the power grid. In addition, the current consumption from the starter battery during these events should be low.

The SOC monitoring events can be synchronized with other automatic monitoring and maintenance events that are performed by the vehicle and already include periodic monitoring of the ECM. In this case, the activation of the DC/DC converter and other functions can be delayed if the ECM is activated at the power grid and a SOC monitoring event is scheduled to measure the voltage of the battery without considerably charging or discharging the battery.

Figure 3:
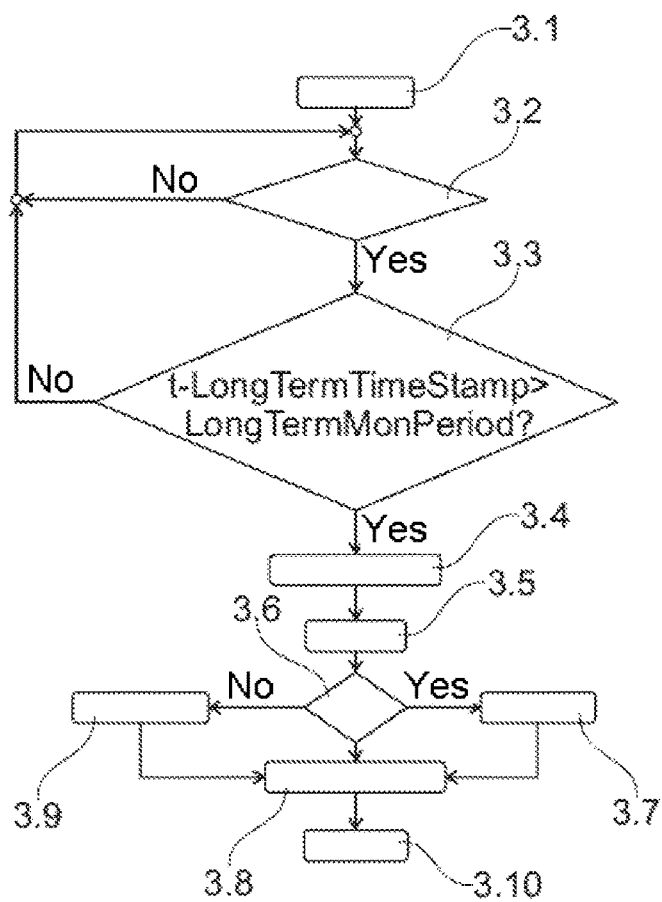
FIG. 3 illustrates an embodiment of an algorithm that includes monitoring the no-load voltage of the starter battery.

FIG. 3 illustrates a control strategy that performs this process. Initially, the ECM is reactivated at block 3.1 and a check is performed in block 3.2 as to whether the vehicle is connected to the power grid and the traction battery is not being charged. Only if the two conditions are fulfilled is a check performed at block 3.3 as to whether the difference between the current time and the time stamp LongTermTimeStamp is greater than the calibrated time period LongTermMonPeriod. If this is the case, the battery voltage is measured as indicated at 3.4 and from the result the charge state SOC of the batteries is estimated in block 3.5. This process of estimating the charge state of the battery from the measured voltage can be performed using a reference table in which the voltage is used as an input variable. If a charge state that is too low is detected in this manner in block 3.6, the flag variable LowSOCFlag is set at 3.7 and the DC/DC converter is activated at 3.8. If however a low charge state is not detected, the time stamp LongTermTimeStamp is set to the current time t at block 3.9 and the DC/DC converter is likewise activated at 3.8. A further process of monitoring and eliminating low charge states of the battery can be subsequently performed at block 3.10.

The monitoring time period within which the charge state of the lead acid battery is periodically monitored during long-term parking phases at the power grid can amount typically to 24 hours. If a low charge state is detected during this periodic monitoring process at the power grid, or if a low charge state condition is assumed as a result of the flag LowSOCFlag, the DC/DC converter is preferably activated to charge the battery using a desired voltage value for the equalization charging process. This charging process can preferably continue until one or a combination of the exit conditions, already explained, is fulfilled.

Figure 4:
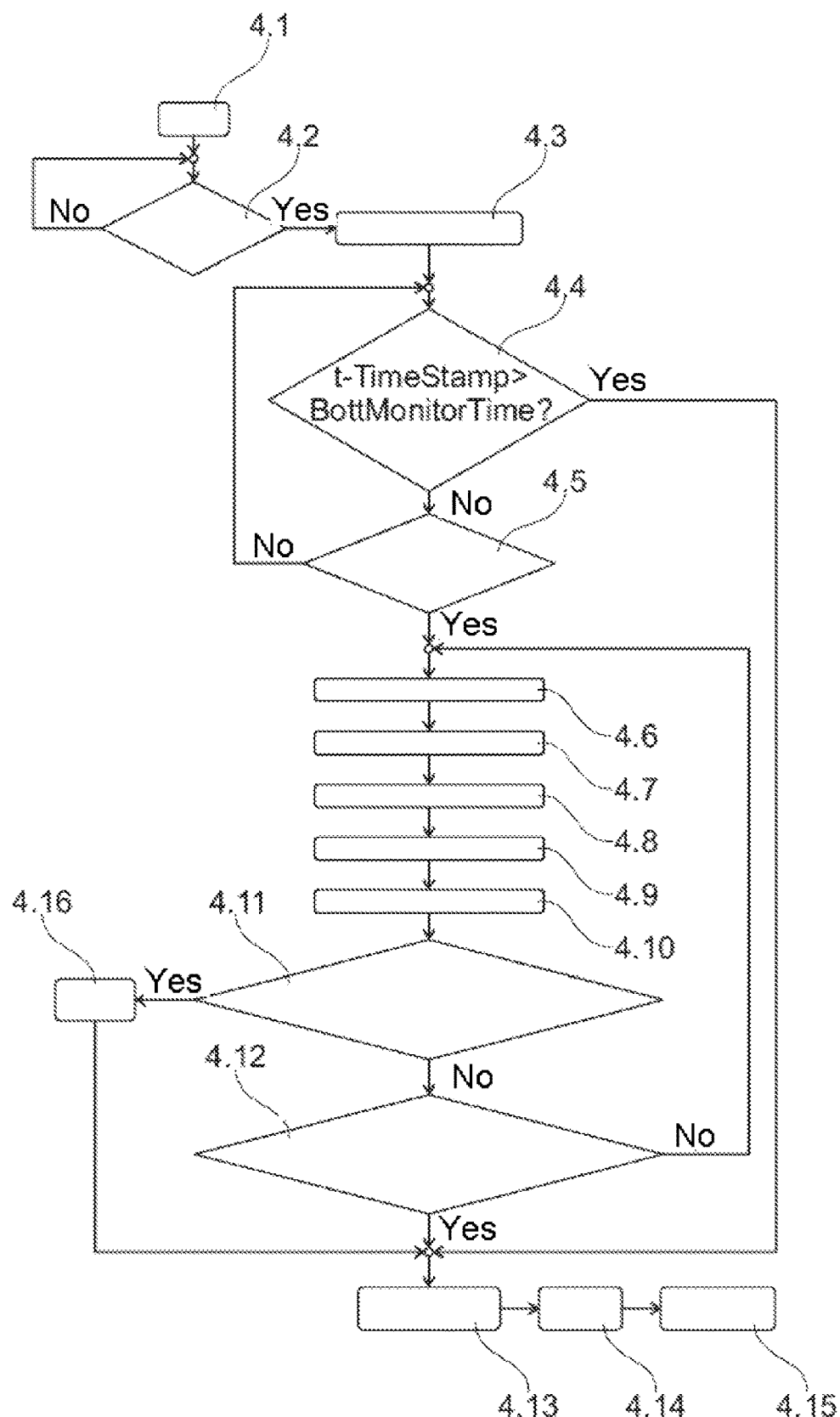
FIG. 4 illustrates an embodiment of a control strategy during long-term phases connected to the power grid.

The exit conditions 1, 3, and 4 also represent in this case conditions for the complete elimination of a low charge state. As illustrated in FIG. 4, the fulfillment of one or more of these conditions terminates the low charge state. As a result of this, the corresponding SOC flag is reset. Furthermore, the process of charging the battery at the power grid is terminated. In contrast, the conditions 2 and 5 again represent the minimum conditions for automatically terminating the process of charging the starter battery so that its electrical functionality is guaranteed. The thresholds that define these conditions should be calibrated in such a manner that the charge that is supplied to the battery during the charging phase at the power grid is sufficiently high to maintain a charge state that guarantees electrical functionality at given maximum loads during the parking phase at the power grid.

After the exit conditions have been fulfilled, the process of charging at the power grid is automatically terminated and the vehicle can be automatically shut down. However, if the conditions 2 or 5 terminate the elimination, the low charge state is not terminated. The corresponding flag therefore remains in the non-volatile member. If the process of charging at the power grid is terminated as a result of one or more of the exit conditions being fulfilled, or because the vehicle has been disconnected by the driver from the power grid (typically in preparation for a journey), a new time stamp LongTermTimeStamp may be stored in the non-volatile memory.

A possible implementation of an elimination strategy in the case of the long-term parking phase at the power grid is illustrated in FIG. 4. The low-charge elimination strategy is activated if the ECM is activated at block 4.1 and the vehicle is connected to the power grid but the traction battery is not being charged as represented by block 4.2. If these initial conditions are fulfilled, it will be assumed that the charge state of the battery is being monitored. If a low charge state is not detected after a calibrated time period BattMonitorTime, or if a low charge state has not been assumed, a new time stamp LongTermTimeStamp can be stored in the non-volatile memory. It is thus possible to determine when the next monitoring time period occurs. The vehicle can subsequently be shut down if no other maintenance routines are to be performed. However, if a low charge state is detected during the calibrated time period BattMonitor Time, or a low charge state has already been assumed at the beginning, the elimination process commences by using a desired voltage value for the equalization charging process.

FIG. 4 illustrates in detail that following blocks 4.1 and 4.2, already described, a time stamp is set in block 4.3 to the current time t. If the check in block 4.4 indicates that the difference between the current time and this time stamp is greater than the calibrated time period BattMonitorTime, the time stamp LongTermTimeStamp is set to the prevailing time at 4.13, the process of charging at the power grid is terminated at 4.14, and the vehicle is automatically switched off at 4.15. If the difference between the current time and the time stamp in block 4.4 is however not greater than the calibrated time period BattMonitorTime, a check is performed in block 4.5 as to whether a low charge state that has been established earlier is assumed or whether such a low charge state is detected afresh. If this is the case, it is provided, as is the case in the flow chart in FIG. 1, that a desired voltage value for an equalization charging process is now used in block 4.6. The "global" timer for the equalization charging process is activated in block 4.7 and the timer for the equalization charging process at the power grid is activated in block 4.8. Furthermore, the "global" integrator for the battery current is activated in block 4.9 and the integrator for the battery charging process at the power grid is activated in block 4.10.

To determine whether the low charge state has been eliminated, the following conditions are checked in step 4.11:

"Global" time of the equalization charging process is greater than the variable EqChargePeriod
and/or
SOC>LowSOCThresh
and/or
Battery current $I_{Batt}$ integrated over the time is greater than the variable GlobalChargeThresh.

If at least one of these conditions is fulfilled, that flag LowSOCFlag is reset at 4.16. If none of the conditions is fulfilled, a check is performed at 4.12 as to whether one of the following exit conditions is fulfilled:

Time of the equalization charging process at the power grid is greater than the variable OPEqChargePeriod
and/or
Battery current $I_{Batt}$ integrated over the time is greater than the variable OnPlugChargeThresh.

If one of the above exit conditions is fulfilled, the method likewise moves to blocks 4.13, 4.14 and 4.15 to terminate the charging process at the power grid and to shut down the vehicle.

Strategies for eliminating low charge states of the batteries at the power grid can be integrated into existing control strategies for the low voltage current supply. The process of controlling the low voltage current supply of battery electric vehicles and hybrid vehicles usually provides for charging the starter battery using an equalization charging voltage. Since this is also advantageous for charging a battery that has a low charge state, it is not necessary to change the desired control value for strategies of this type.

Furthermore, a more complex strategy can also be used that uses both voltage values for equalization charging processes and also for trickle charging processes. A strategy of this type can provide that a flag that is stored in the non-volatile memory and indicates a low charge state is used to indicate low charge states of the battery that have not been eliminated. A trickle charging process is not performed if this flag is set. A control strategy of this type can be combined with an elimination strategy during the charging process at the power grid. If a control strategy for when the vehicle is travelling disconnected from the power grid renders possible a trickle charging voltage or a lower voltage than that used to fully charge the battery, it can be provided that the voltage is replaced by an equalization charging voltage until the low charge state is eliminated.

While representative embodiments are described above, it is not intended that these embodiments describe all possible forms of the claimed subject matter. The words used in the specification are words of description rather than limitation, and it is understood that various changes may be made without departing from the spirit and scope of the claims. Additionally, the features of various implementing embodiments may be combined to form further embodiments within the scope of the claims that may not be explicitly described or illustrated.

What is claimed is:

1. A method for a vehicle having a traction battery, a starter battery, and a control module, comprising, by the control module:
   determining that the vehicle is connected to an external power supply, and while connected to the external power supply;
   activating current supply from the external power supply to the starter battery in response to the traction battery exceeding a first threshold and the starter battery being below a second threshold; and
   deactivating current supply from the external power supply a predetermined time after the starter battery exceeds a third threshold.

2. The method of claim 1 further comprising, by the control module:
   periodically reactivating the current supply from the external power supply and monitoring a charge state of the starter battery; and
   supplying current from the external power supply to the starter battery if the starter battery charge state falls below the second threshold.

3. The method of claim 2 wherein the second threshold is a maximum desired charge state.

4. The method of claim 1 wherein the first threshold is less than a maximum desired traction battery charge state.

5. The method of claim 1 further comprising, by the control module, stopping current supply from the external power supply to the starter battery in response to a starter battery charging period exceeding a first time period.

6. The method of claim 5 further comprising, by the control module, stopping current supply from the external power supply to the starter battery in response to a traction battery charging period exceeding a second time period.

* * * * *